(12) United States Patent
Maurer et al.

(10) Patent No.: US 12,116,930 B2
(45) Date of Patent: Oct. 15, 2024

(54) SCOOP FOR AN AIRCRAFT TURBINE ENGINE

(71) Applicant: SAFRAN AIRCRAFT ENGINES, Paris (FR)

(72) Inventors: Paco Maurer, Moissy-Cramayel (FR); Julien Fabien Patrick Becoulet, Moissy-Cramayel (FR); Serge Rene Morreale, Moissy-Cramayel (FR); Nicolas Stoliaroff-Pepin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/254,775

(22) PCT Filed: Nov. 24, 2021

(86) PCT No.: PCT/FR2021/052087
§ 371 (c)(1),
(2) Date: May 26, 2023

(87) PCT Pub. No.: WO2022/117934
PCT Pub. Date: Jun. 9, 2022

(65) Prior Publication Data
US 2023/0417181 A1      Dec. 28, 2023

(30) Foreign Application Priority Data

Dec. 3, 2020   (FR) ........................................ 2012588

(51) Int. Cl.
*F02C 7/042*       (2006.01)
*B64D 33/02*       (2006.01)
(Continued)

(52) U.S. Cl.
CPC .............. *F02C 7/042* (2013.01); *B64D 33/02* (2013.01); *F02C 7/18* (2013.01); *F02K 1/70* (2013.01)

(58) Field of Classification Search
CPC ... F02C 7/042; F02C 7/18; F02C 9/18; B64D 33/02; F02K 1/70; F16K 11/072;
(Continued)

(56) References Cited

U.S. PATENT DOCUMENTS 3,109,610 A      11/1963   Quenzler et al.
3,228,653 A  *   1/1966    Trimmer ............. F16K 27/0263
                                                              251/367
(Continued)

FOREIGN PATENT DOCUMENTS

FR        3028289 A1     5/2016
WO     2005/016748 A2    2/2005

OTHER PUBLICATIONS

International Search Report received for PCT Patent Application No. PCT/FR2021/052087, mailed on Mar. 3, 2022, 5 pages (2 pages of English Translation and 3 pages of Original Document).

*Primary Examiner* — Steven M Sutherland
(74) *Attorney, Agent, or Firm* — WOMBLE BOND DICKINSON (US) LLP

(57) ABSTRACT

A scoop for an aircraft turbine engine, this scoop including a body which is movable between at least two positions, including a first position in which it is configured to capture part of a first air stream flowing in a first direction, wherein the body is movable into a second position in which it is configured to capture part of a second air stream flowing in a second direction which is opposite to the first direction, and wherein the body is mounted to move freely between the at least two positions so as to automatically adopt the first (Continued)

position when the first air stream flows, and to automatically adopt the second position when the second air stream flows.

13 Claims, 4 Drawing Sheets

(51) Int. Cl.
*F02C 7/18* (2006.01)
*F02K 1/70* (2006.01)

(58) Field of Classification Search
CPC ......... F16K 11/0746; Y10T 137/86847; Y10T 137/87812
See application file for complete search history.

(56) References Cited

U.S. PATENT DOCUMENTS

| | | | |
|---|---|---|---|
| 4,926,633 A * | 5/1990 | Nash | F02K 1/822 239/265.17 |
| 5,269,135 A * | 12/1993 | Vermejan | F02C 7/04 60/266 |
| 2009/0152406 A1 | 6/2009 | Francisco | |
| 2013/0186102 A1* | 7/2013 | Lo | F02K 3/075 60/785 |
| 2014/0202539 A1* | 7/2014 | Landre | F16K 3/30 137/599.14 |
| 2016/0131038 A1 | 5/2016 | Warnet | |

* cited by examiner

[Fig.1]
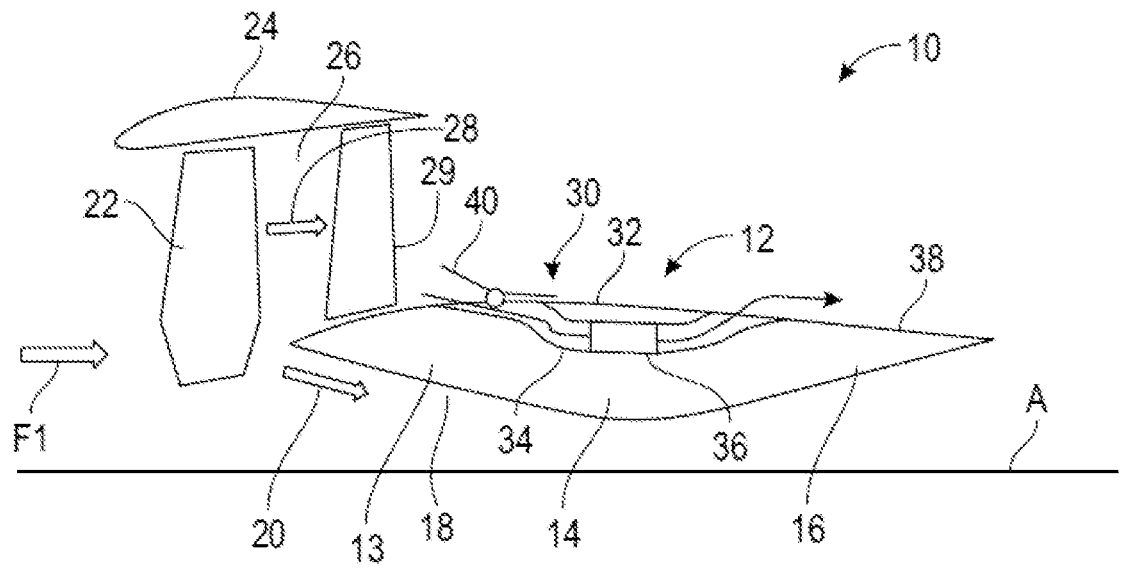
[Fig.2]
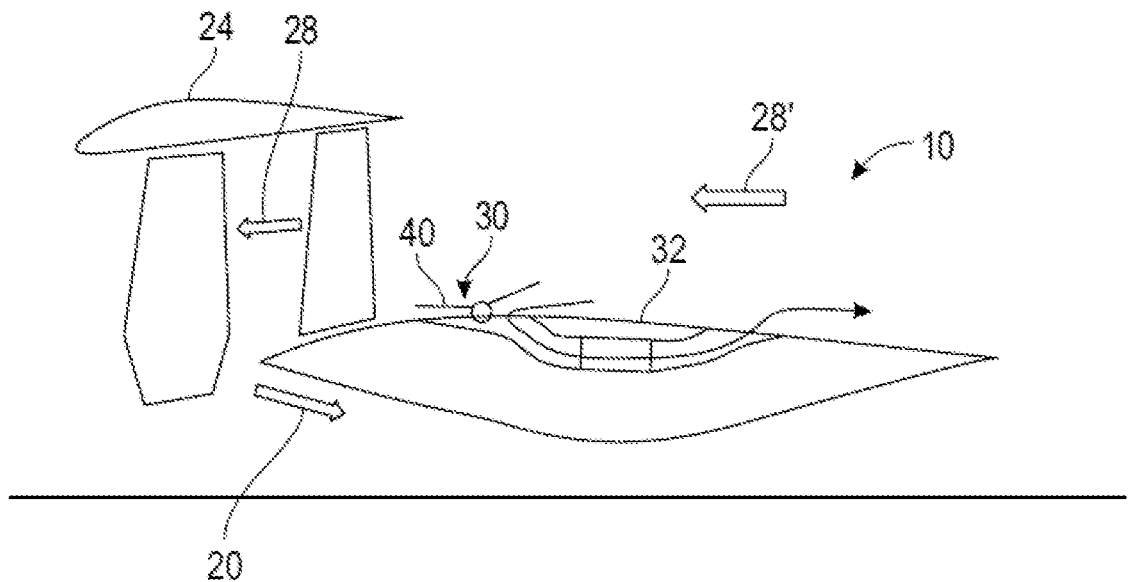

[Fig.3]
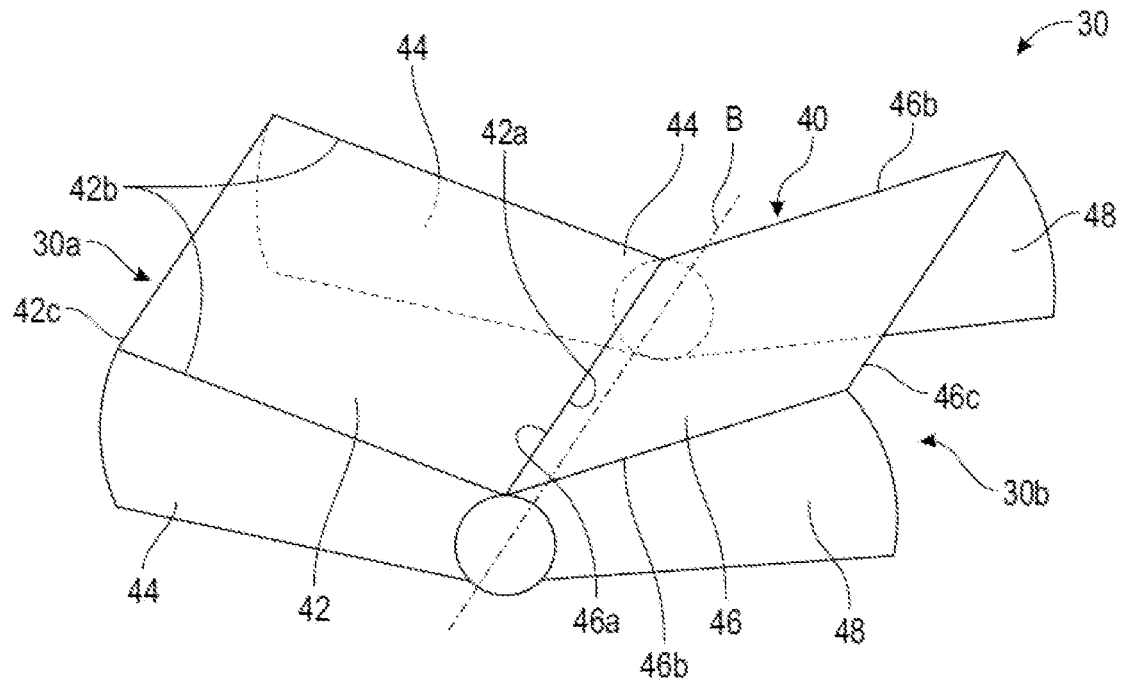
[Fig.4]
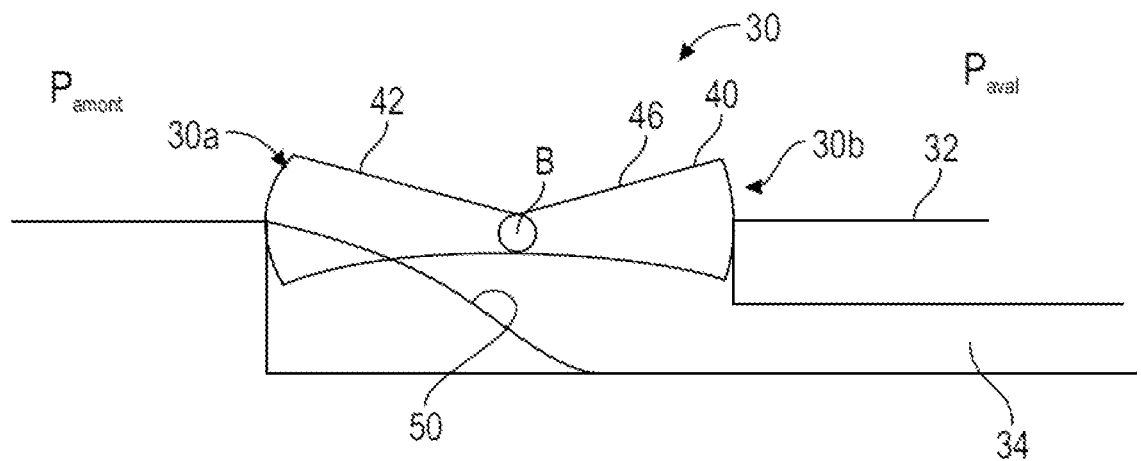

[Fig.5]
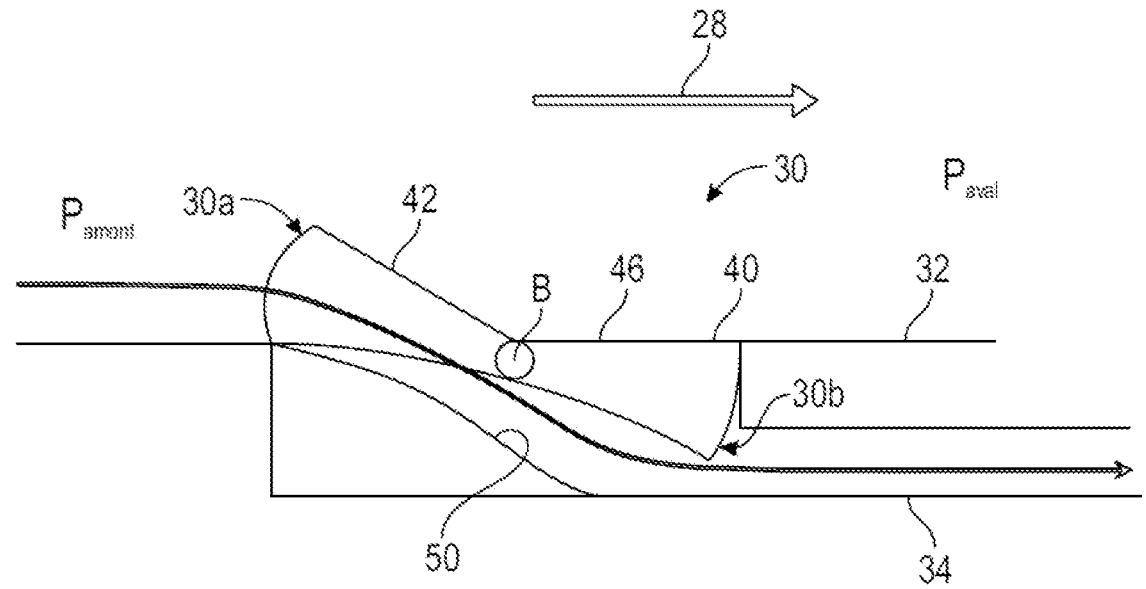
[Fig.6]
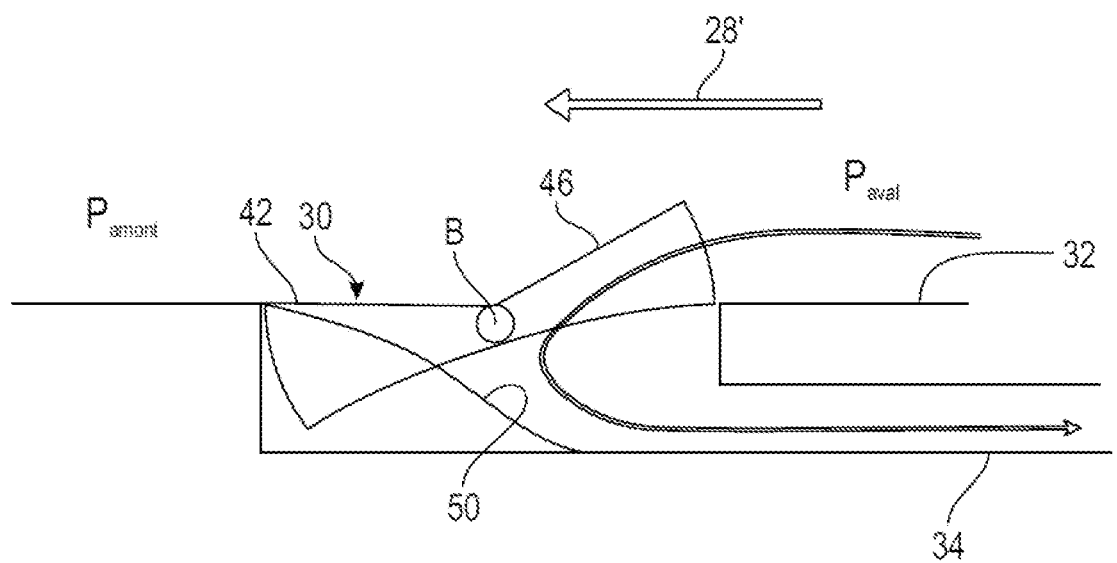

[Fig.7]
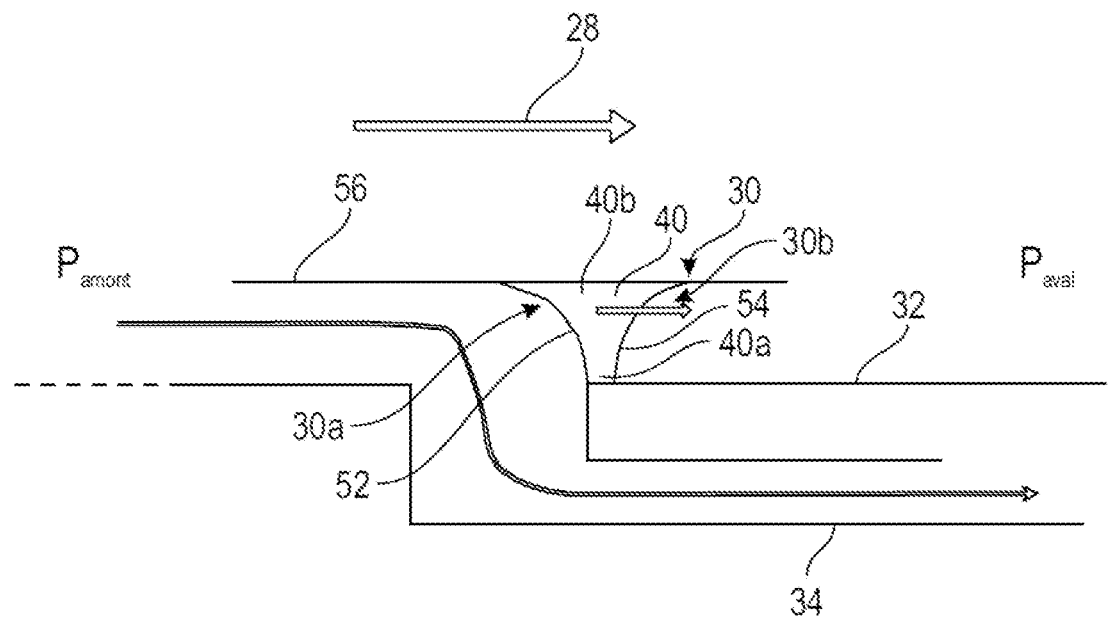
[Fig.8]
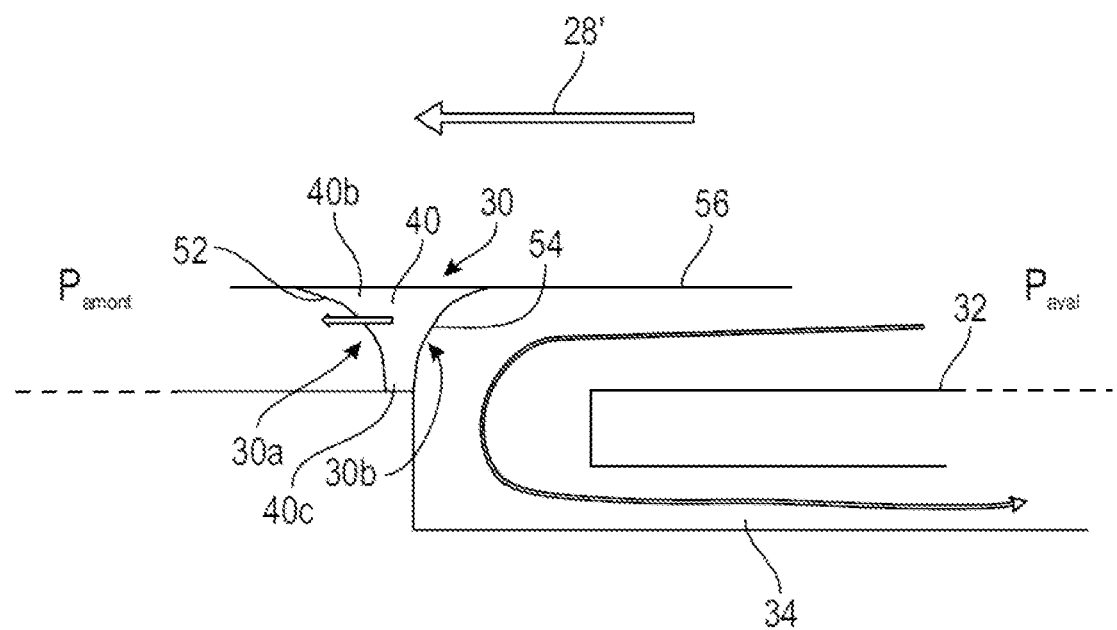

SCOOP FOR AN AIRCRAFT TURBINE ENGINE

TECHNICAL FIELD OF THE INVENTION

The present invention relates to a scoop for an aircraft turbine engine, as well as a turbine engine comprising such a scoop.

TECHNICAL BACKGROUND

The technical background comprises in particular the documents US-A1-2009/152406, WO-A2-2005/016748, U.S. Pat. No. 3,109,610 and FR-A1-3 028 289.

An aircraft turbine engine may be equipped with one or more scoops for the collection of air flowing around or into the turbine engine for the supply of an equipment of the turbine engine.

A scoop is thus a device that allows to capture a part of a flowing air stream. In general, a scoop protrudes from a surface or a wall that is swept by an air stream and this scoop captures a part of this air stream and conveys it to the equipment to be supplied. This equipment is, for example, a heat exchanger, so the air collected is used to supply a cold air circuit of the exchanger.

When the turbine engine is a turbofan engine, the turbine engine comprises a primary flow duct of a primary air stream within a gas generator, and a secondary flow duct of a second stream around the gas generator and within a nacelle that extends around the gas generator and a fan located upstream of the gas generator.

A scoop may be located on an external annular wall of a nacelle of the turbine engine, in order to capture a part of the air stream flowing around the nacelle during operation. A scoop may also be located on an annular wall surrounding the gas generator in order to capture a part of the secondary air stream.

In the prior art, there are two scoop technologies. According to a first technology, the scoop comprises a capture body which is stationary. The advantage of this type of scoop is that it is simple to design and maintain. A disadvantage of this scoop is that it creates an obstacle in the flowing of the air and causes disturbances and pressure losses in this flowing even when air is not required to be collected through the scoop.

In a further technology, the scoop comprises a capture body which is movable from a closed or collapsed position in which the body does not form an obstruction to the airflow, and an open or extended position in which the body extends into the air stream to capture a part thereof. The displacement of the body is then ensured by an actuator and actively controlled by a dedicated control member.

The advantage of this scoop is that it does not create an obstacle and therefore generates little pressure losses in the airflow when not in use, but the disadvantage is that it is complex to carry out and therefore expensive, and also requires regular maintenance operations.

The present invention proposes a solution to at least some of the disadvantages of these prior technologies.

SUMMARY OF THE INVENTION

The present invention relates to a scoop for an aircraft turbine engine, this scoop comprising a body which is movable between at least two positions, a first position in which it is configured to capture a part of a first air stream flowing in a first direction characterised in that said body is movable into a second position in which it is configured to capture a part of a second air stream flowing in a second direction which is opposite to the first direction, and in that said body is mounted so as to move freely between said at least two positions in such a way as to automatically adopt the first position when the first air stream flows, and to automatically adopt the second position when the second air stream flows.

The scoop according to the invention has an autonomous or passive operation, i.e., it moves and adopts a position without any particular intervention, i.e., without any particular mechanical actuation or control.

The scoop according to the invention can furthermore be likened to a double scoop in that it is configured to capture the air coming from two opposite and therefore different directions.

In the particular case mentioned above where the scoop would be mounted on a wall surrounding a gas generator and defining a secondary duct internally, it is understood that a part of an air stream flowing in the first direction, from the fan to an exhaust nozzle of the gases of the turbine engine (which corresponds to the normal operation of the turbine engine), would be captured by the scoop in its first position, and that a part of an air stream flowing in the second direction from the nozzle to the fan (which corresponds to a reverse thrust operation of the turbine engine) would be captured by the scoop in its second position.

The displacement of the body of the scoop between its positions is automatic and depends on the flow direction of the air stream at the level of this body, and more particularly on the capture effect of the air stream which tends to displace the scoop into one of its positions. In other words, it is a dynamic pressure difference across the scoop (between upstream and downstream of the scoop in normal operation of the turbine engine) that causes this displacement. When an air stream flows in the first direction, the dynamic pressure effect upstream of the scoop causes the displacement of the scoop to its first position automatically. When an air stream is flowing in the second direction, the dynamic pressure effect upstream of the scoop (in normal operation of the turbine engine) causes the displacement of the scoop to its second position automatically.

The scoop according to the invention may comprise one or more of the following characteristics, taken in isolation from each other, or in combination with each other:
  said body is pivotally or slidably movable between said positions;
  said body is pivotally movable about an axis substantially perpendicular to said first and second directions;
  said body is configured to adopt an intermediate rest position, located between the first and second positions, in the absence of flow of the first air stream and of the second air stream; when no air stream is flowing at the level of the scoop, there is no capture effect or dynamic pressure and the body of the scoop automatically adopts this intermediate position;
  the scoop comprises an orifice for the passage of air captured by the body, said body being configured to close this orifice when it is in the intermediate position and to open it when it is in each of the first and second positions;
  said body comprises a first aerodynamic capture mouth or surface oriented towards the second direction, and a second aerodynamic capture mouth or surface oriented towards the first direction;
  the first and second aerodynamic surfaces are planar or concave curved;

said body is generally dihedral in shape or generally V-shaped in cross-section;

the scoop comprises a magnet or spring device, configured to maintain the body in at least one of its positions.

The present invention also relates to a turbine engine, in particular for an aircraft, comprising at least one scoop as described above.

The turbine engine according to the invention may comprise one or more of the following characteristics, taken in isolation from each other, or in combination with each other:

the turbine engine is of the dual-flow type and comprises a primary flow duct of a primary stream flowing within a gas generator, and a secondary flow duct of a secondary stream flowing around the gas generator, the scoop being located on an annular wall surrounding the gas generator and internally defining the secondary duct;

the scoop is located at an inlet of a conduit for supplying air to a heat exchanger, for example air/oil;

the turbine engine does not have a thrust reverser and comprises a fan whose vanes are of variable pitch and are capable of adopting a first pitch position allowing the first air stream to flow over the wall, and a second pitch position allowing the second air stream to flow over the wall.

BRIEF DESCRIPTION OF THE FIGURES

Further characteristics and advantages will be apparent from the following description of a non-limiting embodiment of the invention with reference to the appended drawings in which:

FIG. 1 is a schematic half-view in axial cross-section of a turbine engine equipped with a scoop according to the invention, this scoop being in a first position, FIG. 2 is a schematic half-view in axial cross-section of the turbine engine of FIG. 1, the scoop being in a second position, FIG. 3 is a schematic perspective view of an embodiment of a scoop according to the invention, FIG. 4 is a larger scale schematic view of a part of a turbine engine equipped with the scoop of FIG. 3, here in an intermediate rest position, FIG. 5 is a similar view to FIG. 4 and shows the scoop in its first position, FIG. 6 is a similar view to FIG. 4 and shows the scoop in its second position, FIG. 7 is a larger scale schematic view of a part of a turbine engine equipped with an alternative embodiment of a scoop according to the invention, which is here in a first position, and FIG. 8 is a similar view to FIG. 7 and shows the scoop in its second position.

DETAILED DESCRIPTION OF THE INVENTION

FIGS. 1 and 2 show an aircraft turbine engine 10 and in particular a turbofan engine.

The turbine engine 10 comprises a gas generator 12 comprising, from upstream to downstream with respect to the circulation orientation of the gases according to a normal operation illustrated in FIG. 1 (see arrows), at least one compressor 13, a combustion chamber 14 and at least one turbine 16. The gas generator 12 defines an annular flow duct 18 of a primary stream 20 which flows into the compressor 13 and is mixed with fuel and burnt in the combustion chamber 14, to be expanded in the turbine 16.

A fan 22 is mounted at an axial end of the gas generator 12, upstream in the example shown and with reference to the circulation of the gases according to the normal operation of FIG. 1, and comprises a propeller driven in rotation by the rotor of the compressor and of the turbine. In the case of a dual-body gas generator 12, low pressure and high pressure respectively, the fan 22 would be driven in rotation by a shaft of the low pressure body.

The fan 22 and at least a part of the gas generator 12 are surrounded by a nacelle 24 which defines around the gas generator 12 an annular flow duct 26 of a secondary stream 28. The nacelle 24 is connected to the gas generator 12 by structural arms 29 which extend substantially radially between the gas generator and the nacelle with reference to the longitudinal axis A of the turbine engine which corresponds to the main axis of rotation of its rotor or rotors and in particular of the aforementioned low pressure body.

The air stream entering the turbine engine (arrow F1) enters the nacelle 24 and passes through the fan 22, and then splits into two annular and coaxial streams, the external annular stream corresponding to the aforementioned secondary stream 28, and the internal annular stream corresponding to the primary stream 20.

As mentioned above, FIG. 1 represents the normal operating mode of the turbine engine 10 in which the secondary stream 28 flows from upstream to downstream of the turbine engine 10 and thus from left to right in the drawing.

FIG. 2 shows a reverse stream mode of operation in which the secondary stream 28' flows from downstream to upstream and thus from the right to the left of the drawing.

This reversal of the flowing orientation of the secondary stream 28' can be carried out by a thrust reverser located downstream of the nacelle 24. Preferably, in the context of the present invention, this reversal is carried out by the fan 22 itself, which comprises variable pitch blades capable of adopting a pitch position in which they reverse the flowing orientation of the gases in the turbine engine. This technology allows the turbine engine to be equipped without a thrust reverser and therefore simplifies the nacelle by shortening it, as in the example shown.

The present invention proposes a scoop 30 that is capable of capturing air regardless of which of two opposite direction the air is flowing. The scoop 30 according to the invention can thus be likened to a double scoop.

FIGS. 1 and 2 illustrate an example of the implementation of a scoop 30 in the turbine engine 10. The scoop 30 is here installed on an external annular wall 32 of the gas generator 12 which internally defines the flow duct 26 of the secondary stream 28, 28'.

Alternatively, the scoop 30 could be mounted on an annular wall that defines the duct 26 externally, such as a wall of the nacelle 24 for example. The scoop 30 can be mounted in any axial position along the axis A.

The scoop 30 is mounted at one end of a conduit 34 for conveying air to a heat exchanger 36, of the air/oil type for example. This end forms an air inlet orifice into the conduit.

The end of the conduit 34, opposite the scoop 30, opens for example into a nozzle 38 for exhausting the gases of the turbine engine 10. The exchanger 36 is here located substantially in the middle of the conduit 34.

According to the invention, the scoop 30 comprises a body 40 which is movable between at least two positions of which:

a first position shown in FIG. 1 in which it is configured to capture a part of a first air stream flowing in a first direction, such as the secondary stream 28, and a second position shown in FIG. 2 in which it is configured to capture a part of a second air stream flowing in a second direction that is opposite to the first direction, such as the reverse secondary stream 28'.

The body 40 is mounted free in displacement between these aforementioned positions so as to automatically adopt the first position when the first air stream flows, and to automatically adopt the second position when the second air stream flows.

FIGS. 3 to 6 illustrate a first embodiment of the scoop 30 and FIGS. 7 and 8 illustrate a second embodiment of this scoop.

The scoop 30 in FIG. 3 comprises a body 40 which is pivotally movable about an axis B substantially perpendicular to the two directions mentioned above.

The scoop 30 has a general dihedral shape and comprises two capture mouths 30a, 30b. A first side of the dihedral comprises a generally rectangular wall 42. One edge 42a of this wall 42 is located at the level of the axis B and two opposite edges 42b of this wall 42, which are substantially perpendicular to the axis B, are connected to rims 44 which are parallel and facing each other. The edge 42c of the wall opposite the edge 42a defines a first capture mouth 30a with adjacent edges of the rims 44.

A second side of the dihedral comprises a generally rectangular wall 46. An edge 46a of this wall 46 is located at the level of the axis B and adjoins the edge 42a of the wall 42. Two opposite edges 46b of the wall 46, which are substantially perpendicular to the axis B, are connected to rims 48 which are parallel and facing each other. The edge 46c of the wall opposite the edge 46a defines the second capture mouth 30b with adjacent edges of the rims 48.

The scoop 30 in FIG. 3 can automatically adopt at least three positions shown in FIGS. 4 to 6 respectively.

The scoop 30 is first configured to adopt an intermediate rest position shown in FIG. 4, in the absence of flow around this scoop and over the wall 32. This position is adopted automatically by the fact that the pressures located just upstream and downstream of the scoop (Pamont and Paval, respectively), i.e., at the level of the two capture mouths 30a, 30b, are identical. In this case, the body of the scoop may or may not seal the inlet orifice of the conduit 34.

The scoop 30 is also configured to automatically adopt a position shown in FIG. 5 when swept by the secondary stream 28. The dynamic pressure upstream of the scoop (Pamont) is then higher than the dynamic pressure downstream of the scoop (Paval). The capture mouth 30a is open and the capture mouth 30b is closed. A part of the secondary stream 28 is then captured by the scoop 30 and enters the conduit 34 which may comprise an aerodynamic airflow optimising surface 50 at the level of the inlet orifice so as to prevent the detachments.

In this position, the wall 46 preferably extends in the extension with the wall 32, as can be seen in FIG. 5.

The scoop 30 is also configured to automatically adopt a position shown in FIG. 6 when it is swept by the secondary stream 28'. The dynamic pressure Pamont is then lower than the dynamic pressure Paval. The capture mouth 30b is open and the capture mouth 30a is closed. A part of the secondary stream 28' is then captured by the scoop 30 and enters the conduit 34. In this position, the wall 42 preferably extends in the extension with the wall 32, as can be seen in FIG. 6.

Although not shown, the scoop 30 could comprise a magnet or spring device which would be configured to maintain the body in at least one of the three positions mentioned above, and thus avoid any oscillation about that position in operation. The body would, for example, be maintained in the position shown in FIG. 4 by a magnet or a spring, the maintaining force of which would be overcome as soon as the secondary stream 28 or 28' flows. The body would, for example, be maintained in each of the positions in FIGS. 5 and 6 by a magnet or spring, the maintaining force of which would be overcome as soon as the airflow disappeared or was reversed.

The scoop 30 of FIGS. 7 and 8 comprises a body 40 which is movable in translation along an axis parallel to the aforementioned axis A.

The scoop 30 is generally V-shaped in cross-section and comprises two concave curved aerodynamic surfaces 52, 54, upstream and downstream respectively, which define the capture mouths 30a, 30b of the scoop.

The body 40 comprises a lower end 40a (or inner with respect to the axis A) which is relatively thin in the axial direction and which is slidable on the wall 32, and an upper end 40b which is thicker in the axial direction and which is slidable on a further wall 56 mounted on or around the wall 32. It is therefore understood that the scoop is sandwiched between the walls 32 and 56.

The scoop 30 is configured to automatically adopt a position shown in FIG. 7 when swept by the secondary stream 28. The dynamic pressure Pamont is then higher than the dynamic pressure Paval. The capture mouth 30a and in particular the surface 52 captures and guides a part of the secondary stream 28 towards the conduit 34.

In this position, the lower end 40a of the body 40 of the scoop 30 is located just downstream of the inlet orifice of the conduit 34 and rests on the wall 32.

The scoop 30 is also configured to automatically adopt a position shown in FIG. 8 when swept by the secondary stream 28'. The dynamic pressure Pamont is then lower than the dynamic pressure Paval. The capture mouth 30b and in particular the surface 54 captures and guides a part of the secondary stream 28' towards the conduit 34.

In this position, the lower end 40a of the body 40 of the scoop 30 is located just upstream of the inlet orifice of the conduit 38 (with reference to the airflow in normal operation) and resting on the wall 32.

Although not shown, the scoop 30 could comprise a magnet or spring device which would be configured to maintain the body in at least one of the two aforementioned positions, and thus avoid any oscillation about that position in operation. The body would, for example, be maintained in each of the positions in FIGS. 5 and 6 by a magnet or a spring, the maintaining force of which would be overcome as soon as the airflow disappeared or was reversed. The body could also be biased upon by this type of device, in the absence of any flow, in an intermediate position of closing the inlet orifice of the conduit 34.

Although the invention has been described and illustrated in the context of a faired turbine engine, equipped with a nacelle and structural arms for connecting the gas generator to the nacelle, the invention is not limited to this type of turbine engine and is equally applicable, for example, to a non-faired propeller turbine engine.

The invention claimed is:

1. A scoop for an aircraft turbine engine, the scoop comprising a body which is movable between at least three positions, including:

a first position in which it is configured to capture a part of a first air stream flowing in a first flow direction, a second position in which it is configured to capture a part of a second air stream flowing in a second flow direction which is opposite to the first flow direction, and an intermediate rest position, located and intermediate between the first and second positions, in the absence of flow of the first air stream and of the second air stream, wherein said body is mounted to move freely between said at least first and second positions from said intermediate rest position so as to automatically adopt the first position when the first air stream flows, and to automatically adopt the second position when the second air stream flows, wherein said body is movable into the first position by moving into a first move direction from said intermediate rest position, and said body is movable into the second position by moving into a second move direction from said intermediate rest position, and said first move direction being opposite to said second move direction.

2. The scoop according to claim 1, wherein said body is pivotally or slidably movable between said at least two positions.

3. The scoop according to claim 2, wherein said body is pivotally movable about an axis substantially perpendicular to said first and second flow directions.

4. The scoop according to claim 1, wherein the scoop comprises an orifice for the passage of air captured by the body, said body being configured to close the orifice when the body is in the intermediate rest position and to open the orifice when the body is in each of the first and second positions.

5. The scoop according to claim 1, wherein said body comprises a first aerodynamic capture mouth or surface oriented towards the second flow direction, and a second aerodynamic capture mouth or surface oriented towards the first flow direction.

6. The scoop according to claim 5, wherein the first and second aerodynamic surfaces are planar or concave curved.

7. The scoop according to claim 1, wherein said body has a general dihedral shape or a general V-shape in cross-section.

8. A turbine engine, for an aircraft, comprising at least one scoop according to claim 1.

9. The turbine engine according to claim 8, wherein the turbine engine is of a dual-flow type and comprises a primary flow duct of a primary stream flowing within a gas generator, and a secondary flow duct of a secondary stream flowing around the gas generator, the scoop being located on an annular wall surrounding the gas generator and internally defining the secondary flow duct.

10. The turbine engine according to claim 9, wherein the scoop is located at an inlet of a conduit for supplying air to a heat exchanger.

11. The turbine engine according to claim 10, wherein the turbine engine has no thrust reverser and comprises a fan whose vanes are of variable pitch and are capable of adopting a first pitch position allowing the first air stream to flow over the annular wall, and a second pitch position allowing the second air stream to flow over the annular wall.

12. The turbine engine according to claim 10, wherein the heat exchanger is an air/oil heat exchanger.

13. A scoop for an aircraft turbine engine, the scoop comprising a body which is movable between at least two positions, including a first position in which the body is configured to capture a part of a first air stream flowing in a first direction, wherein said body is movable into a second position in which the body is configured to capture a part of a second air stream flowing in a second direction which is opposite to the first direction and in that said body is mounted to move freely between said at least two positions so as to automatically adopt the first position when the first air stream flows, and to automatically adopt the second position when the second air stream flows, wherein the scoop is located at an inlet of a conduit for supplying air to a heat exchanger.

* * * * *